May 24, 1938.  H. G. FERGUSON  2,118,180
TRACTOR FOR AGRICULTURAL IMPLEMENTS
Filed Jan. 27, 1937  2 Sheets-Sheet 1
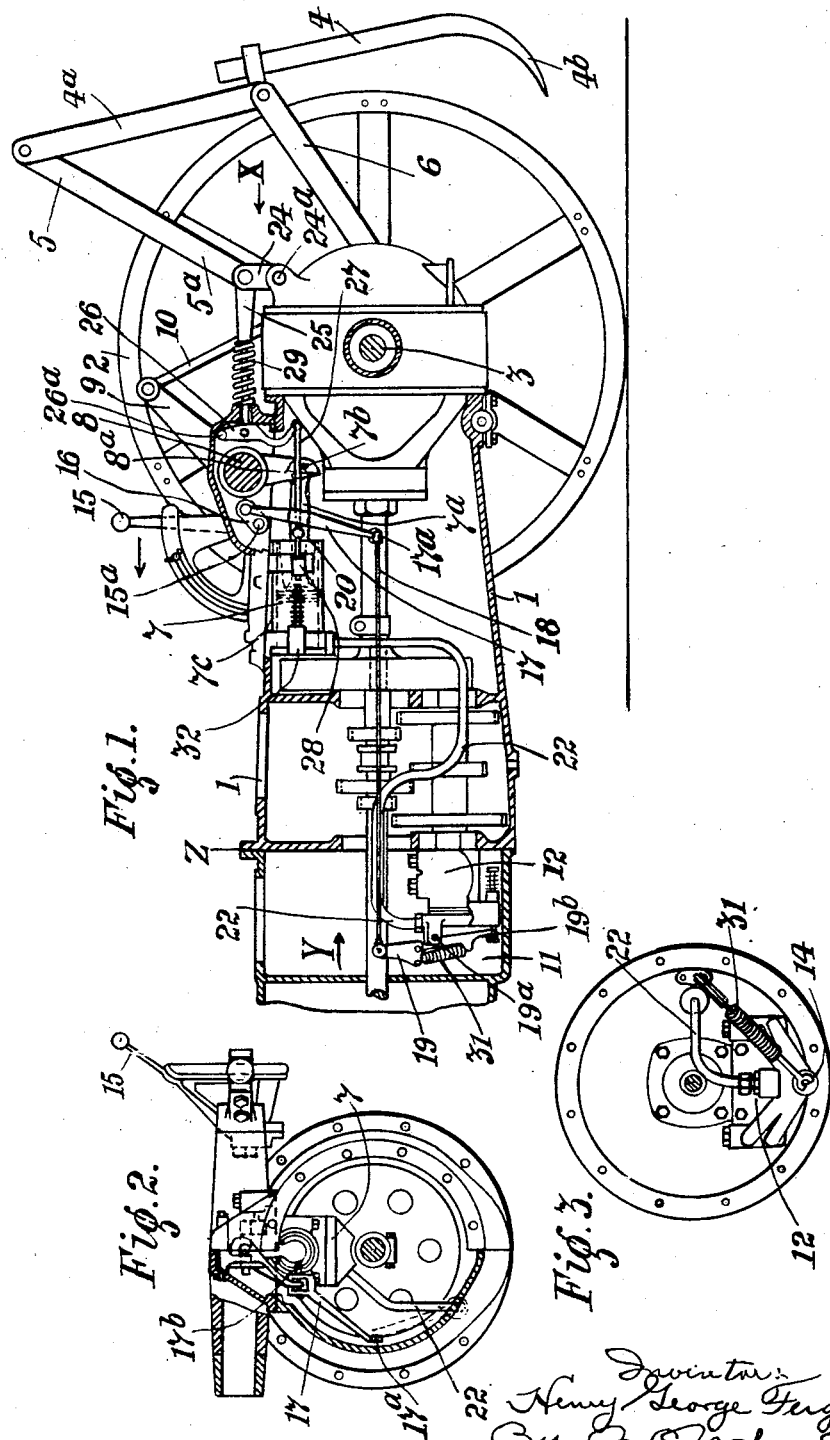

May 24, 1938.  H. G. FERGUSON  2,118,180
TRACTOR FOR AGRICULTURAL IMPLEMENTS
Filed Jan. 27, 1937  2 Sheets-Sheet 2
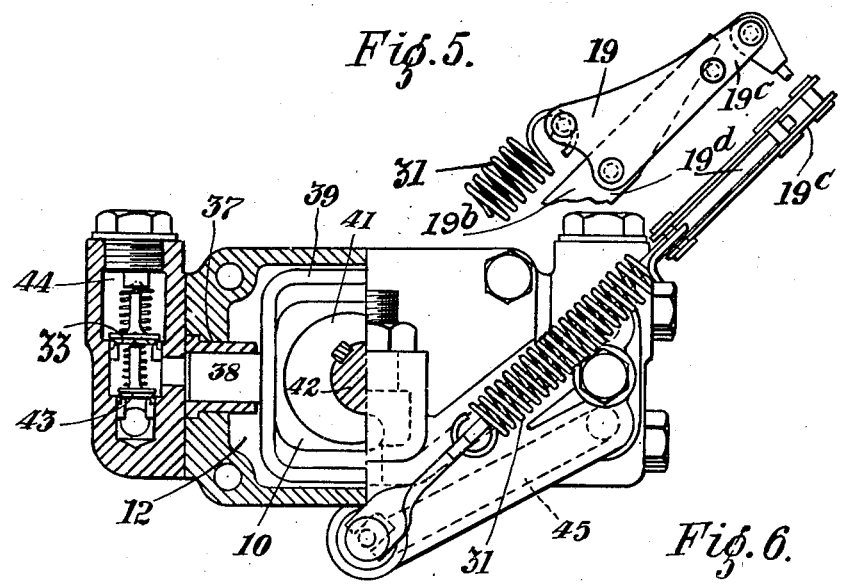
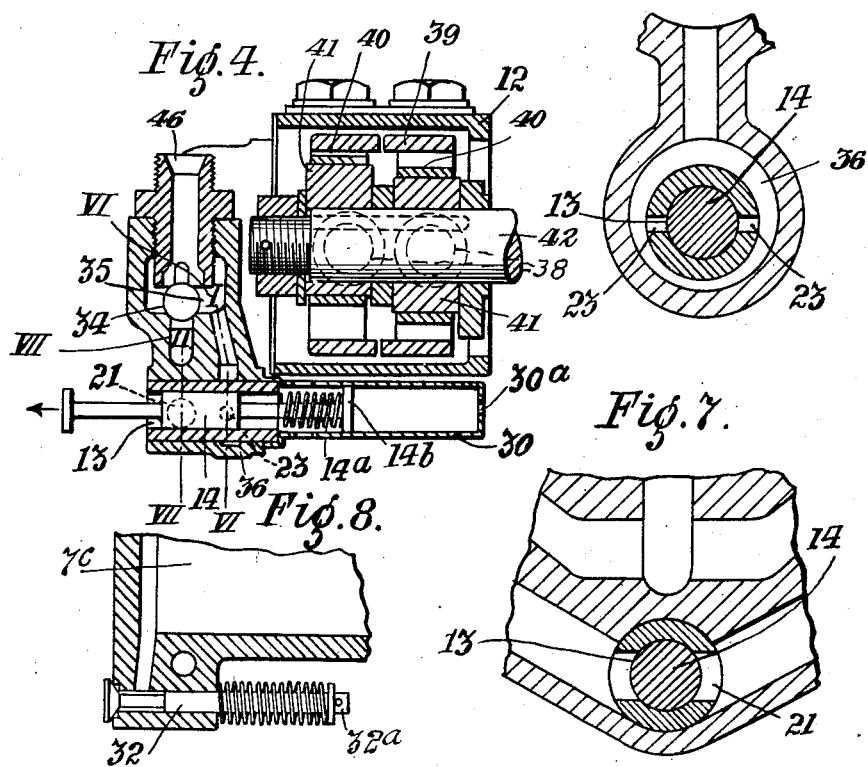

UNITED STATES PATENT OFFICE 2,118,180

TRACTOR FOR AGRICULTURAL IMPLEMENTS

Henry George Ferguson, Belfast, Northern Ireland

Application January 27, 1937, Serial No. 122,609
In Great Britain February 5, 1936

20 Claims. (Cl. 97—50)

This invention relates to improvements in control of tractor-drawn agricultural implements, and more especially to tractors having a pressure fluid power-operated control unit for automatically controlling the depth of the implement and/or for raising and lowering of the implement in a manner similar to the power unit described in my prior patent specification No. 1,687,719.

It has been found that when an implement is attached to a tractor as a unit and controlled for depth regulation by fluid pressure means, the operating fluid tends to become overheated and aerated if it has to be pumped continuously and controlled under pressure.

To overcome this difficulty an object of the invention is to provide that the fluid is controlled on the suction side of the pump and so that the supply can be varied, cut off or discharged in accordance with requirements for automatically keeping the implement at a regular depth and/or also for raising and lowering the implement.

A further object is to effect the control by a valve the length of which, and the distance between the suction port or ports and the release port or ports, are so arranged as to provide that both suction and release ports may be covered at the same time, whereby movement of the fluid can be prevented in either direction. The period when the valve covers both ports is what I term the "dead point" or mid-position.

When the implement is operated in the ground at a predetermined depth which has been fixed by manual control means, the valve remains on the "dead point" until changed from it by a variation in the draft. For example, if the implement were to go deeper the draft would be increased. This would open the suction ports and allow fluid into the pump. The implement would then be automatically raised to the predetermined depth and the valve would then automatically return to the "dead point". Similarly, if the draft on the implement were reduced due to its becoming shallower in the ground, the mechanism would work in the opposite way by the uncovering of the release ports and allowing the implement to return to the predetermined depth, the valve again being automatically moved to the dead point. Thus automatic control is effected without continuously pumping fluid under pressure, so that overheating and aerating are avoided.

It has been found that in operation some implements are inclined to move the fluid control valve more than necessary. A further object is to provide damping means on the valve so as to slow or reduce these movements, and so save excessive wear on the valve and its controlling mechanism and on the pump.

To prevent damage to the mechanism for operating the control valve, a further object is to provide safety means between the valve and the control lever worked by the operator. If the operator unduly forces the control lever the safety means, for example, a shock-absorbing spring will prevent any excessive load being imposed upon the mechanism or the valve.

An implement such as hereinbefore referred to is usually transported on the tractor by raising it to a predetermined height above the ground. A further object is to provide automatic means connected with the mechanism for cutting off the fluid supply to the pump, so that when the implement reaches the predetermined height it will automatically stop ascending. This may be done, for example, by arranging that when a ram piston, which operates the raising mechanism, reaches a predetermined position it will come into engagement with control mechanism for the fluid valve and the valve will be moved to the "dead point" where the fluid supply is cut off.

In a preferred arrangement oil is drawn from a tank or sump by a suitable form of pump and in the pipe line leading to the suction side of the pump, I provide a piston valve, in a suitable valve chamber, for controlling the oil, the movements of the said piston valve being controlled by a hand lever convenient to the operator on the tractor, and also automatically controlled by variations of draft on the implement, the hand lever, when required, working independently of the automatic control and also, when required, serving to regulate the automatic control of the implement. On the pressure or ram side of the pump I provide a port or passage connecting with the aforesaid valve chamber so that when the valve is moved, either by hand or automatically, to a predetermined position, this port will be uncovered and allow the fluid to flow back again to the sump or tank. When the pump is in operation and the fluid has passed the pump, it is led to a ram chamber to operate the ram by means of which the implement is operated, or controlled. Thus continual pumping and consequent overheating and aeration of the oil is avoided owing to the control being on the suction side of the pump.

The invention will now be described by way of example only with reference to a specific embodiment thereof as shown on the accompanying drawings wherein:—

Fig. 1 is a part longitudinal sectional elevation of the rear portion of a tractor having means provided for hydraulic control of an implement attached to the tractor, the implement being shown in the raised position.

Fig. 2 is a view partly in section looking in the direction of the arrow X, Fig. 1 with the rear axle and crown gear housing removed.

Fig. 3 is a view looking in the direction of the arrow Y, Fig. 1 with the tractor casing removed at the joint Z.

Fig. 4 is a sectional detail elevation of the hydraulic pump and control valve.

Fig. 5 is a front elevation, one half in section, of the hydraulic pump and showing the control valve and connection thereto.

Fig. 6 is a sectional view to a larger scale, on the line VI—VI, Fig. 4.

Fig. 7 is a sectional view, to a larger scale, on the line VII—VII, Fig. 4.

Fig. 8 is part sectional plan of the ram cylinder showing the arrangement of the safety valve.

Referring to the drawings:—

In the example shown in the drawings, 1 denotes the rear portion of the tractor casing, 2 the rear wheels of the tractor, 3 the rear axle of the tractor, 4 denotes the implement and 5 and 6 respectively denote the upper and lower link connection between the tractor and the implement, which, in this particular example, is a cultivator. Obviously this may be replaced by any other implement as the occasion demands.

On the tractor and located in front of the rear axle as shown in Fig. 1, is a hydraulic ram 7, which includes the cylinder 7c and the piston of which is pivotally connected to the connecting rod 7ª which, in turn, is pivotally connected at 7b to the arm 8ª mounted on the ram shaft 8. Connected to the shaft 8 are two lift arms 9 which, in turn, are connected by two lift rods 10 to the lower links 6 connecting the frame 4ª of the implement 4 with the tractor, the implement 4 being shown in the raised position. Oil is drawn from a tank or sump 11 by a pump 12 which, together with the ram connected to it by the pipe 22, constitutes a pressure-fluid control unit or assembly referred to in the claims as a "unit" for convenience, the pump being continuously driven by the tractor engine while the engine is running. Details of this pump are shown at Figs. 4 and 5. It is a four-cylinder unit with two pairs of horizontally-opposed cylinders 37. Each pair of pistons 38 projects from the two ends of a square frame 39 embracing a sliding block 40, the reciprocating motion for the blocks 40 being obtained from eccentrics 41 mounted on the driving shaft 42. The two eccentrics 41 are set at right angles as can be seen from Fig. 4, so that the four pistons 38 operate successively giving a sufficiently regular flow to the oil to prevent any perceptible irregularity in the lift of the tool frame. The delivery valves 33 are mounted vertically above the suction valves 43, as shown to the left in Fig. 5. From the chambers 44 above the delivery valves 33, the oil is taken through sloping branch passages 45 to the underside of the ball valve 34, shown below the delivery outlet 46 in Fig. 4, to which outlet the pipe 22 is connected. When the pump is in operation, the ball valve is lifted, and the oil has two possible paths, one being through the delivery outlet 46 to the pipe 22 and the ram cylinder 7c, and the other through the by-pass passage 35 to a circular space 36 embracing the sleeve of the piston control valve 14. This sleeve is drilled as at 23 to give a restricted release port opening into the sleeve centre space, the restriction limiting the speed of lowering the implement as later described. The piston valve 14 is provided in the passage 13 which leads to the suction side of the pump. This valve 14 is for controlling the admission of oil, its movements being controlled by a hand lever 15, (Fig. 1), convenient to the operator, on the tractor. The hand lever 15 is connected with the piston valve 14 as follows:—

Its lower end 15ª is mounted on a shaft carrying a crank 16, the other end of which is pivotally connected to the top end of a lever 17. The lower end 17ª of the lever 17 is connected with a rod or wire 18 which, in turn, is connected at its opposite end to a spring loaded lever 19, pivoted at 19ª, and forked at its end 19b to engage the head of the valve 14. Movement of the hand lever 15 in the direction of the arrow shown in Fig. 1 will move the end 17ª of the lever 17 around a fulcrum 20, the lever being kept in contact with the fulcrum 20 by the spring 14ª (Fig. 4) which is provided on one end of the valve 14; such movement of the hand lever causing the valve 14 to move in the direction of the arrow in Fig. 4. The spring 14ª also serves to keep looseness out of the mechanism and serves to take up any wear that may arise. Movement of the hand lever 15 in the opposite direction will reverse the movement of the valve.

The implement 4, as previously stated, is pivotally connected to the upper and lower links 5 and 6 by means of its frame 4ª. The upper link 5 is connected at its end 5ª with a rocker 24 pivoted at 24ª to the back of the tractor. The rocker 24 is pivotally connected to a rod 25 on which is mounted a heavy compression spring 29. The rod 25 is pivotally connected at its opposite end to a lever 26 which is pivoted at its upper end 26ª to the tractor casing and at its lower end to a rod 27 on which is fastened the fulcrum 20, previously referred to. Beyond the fulcrum 20 the front end of the said rod is slidably supported in a bearing 28. The rod 27 passes through a slot in the lever 17.

As regards the manual control of the implement the arrangement is as follows:—

When the hand lever 15 is moved from the vertical position in the direction of the arrow in Fig. 1 the lever 17 is moved anti-clockwise about the fulcrum 20, moving the rod or wire 18 to the right, which in turn operates the articulated lever 19 thereby moving the valve 14 to the left (Fig. 4) and uncovering the release ports 23 and allowing the oil to escape from the ram cylinder 7c at a slow rate. The piston thus moves slowly into the cylinder 7c under the weight of the implement, which drops gently to the ground and, as a result of the draft which is then imposed on the implement, it tends to turn in an anti-clockwise direction about the pivotal connection of the frame 4ª. This tendency is resisted by the spring 29 which is compressed by the rod 25 moving to the left, swinging the lever 26 and causing the rod 27 with the fulcrum 20 thereon to swing to the left by its connection to the link 16. This return movement of the lever 17 allows the valve 14 to move to the right and to cover the release ports 23 without moving the hand lever 15 from the position to which it was moved by hand. When the implement reaches the desired depth the valve 14 covers the ports 21 and 23, and it will be seen that the depth is regulated by the position of the lever 15.

Adjustment of the hand lever 15 from the position shown in Fig. 1 (the raised position) moves the top of lever 17 to the left and the implement is lowered as above described. This lowering movement continues until the fulcrum 20 has been moved sufficiently far to the left to allow the valve 14 to close the ports 23 and arrest the lowering movement of the implement. Thus the further the lever 17 is moved to the left by the hand lever 15, the further will the implement be lowered before there has been sufficient movement of the fulcrum to arrest the lowering movement.

To raise the implement, the hand lever 15 is moved back to the vertical position, the bottom end of the lever 17 being moved to the left, thereby moving the rod or wire 18 and lever 19 so that the valve 14 is moved to the right and uncovers the ports 21, which are the inlet ports of the pump, allowing oil to flow to the pump which, operating through the ram and linkage 8ª, 8, 9, 10 and 6, raises the implement. As the implement rises, the rod 25 (due to the removal of the draft on the implement) is moved by the spring 29 to the right, thereby swinging the lower end of the lever 26 to the right which in turn moves the rod 27 and fulcrum 20 thereon, to the right, bringing the lever 17 to the right therewith, which, operating through the rod or wire 18 and lever 19 moves the valve to the left, so that, when the implement is fully raised, the valve 14 covers the ports 21 and 23, cutting off the supply of oil to the pump and cutting off the escape of oil from the pump and keeping the implement in the raised position.

I will now describe the action of the automatic control:—Firstly, the control lever 15 is set to give the desired predetermined depth of cut in the ground. As long as the implement is working, and the draft on the implement remains the same, the compression load on the spring 29 will be constant, it being understood that, in operation, the links 5 and 6 are respectively in compression and tension. Under these conditions the valve 14 will remain on the "dead point", that is, with the ports 21 and 23 closed. This position of the valve 14 is shown at Fig. 4, no movement of the oil taking place in either direction and consequently no movement of the ram taking place in either direction.

If, however, the implement 4 is subjected to an increase in draft due, for example, to the front wheels of the tractor rising on a height and pitching the implement more deeply into the ground, such increase will instantaneously be transmitted to the rod 25 causing an increase in the compression thereon, which in turn, will cause the rod to compress the spring 29 further. At the same time the lever 26 will be moved about its pivot 26ª with a resultant movement of the rod 27 and the fulcrum 20 thereby permitting the lever 17 to move to the left in Fig. 1, that is, forwardly under the action of the spring 14ª on the valve 14. This forward movement of the lever 17, through the rod 18 will cause a corresponding movement of the spring loaded lever 19 which will allow the spring 14ª to move the valve 14 rearwardly thus uncovering the suction ports 21 so that oil will be admitted to the pump 12 which then pumps the oil to the ram cylinder 7ᶜ which will be moved outwardly and will raise the implement in the manner already described. When the implement has been raised to a point where the draft thereon again reaches the predetermined amount, to give the necessary depth of cut, the spring 29 reacts and brings the valve 14 back again to the dead point with both the ports 21 and 23 closed.

If the implement be subjected to a reduction in draft, due for example, to the front wheels of the traction dropping into a hollow and so raising the implement relatively to the ground and thus making it cut too shallow, the action upon the spring 29 will be reversed and the valve 14 will be moved in a forward direction. This will open the restricted release ports 23, will allow oil to flow back from the ram cylinder 7ᶜ and will allow the implement to fall back to the predetermined depth of cut. When the predetermined depth has been reached the control valve 14 will again come back to the dead point under the action of the increased draft as previously described.

It will be noted that control of the oil to the pump 12, which supplies the oil under pressure to the ram cylinder, is arranged on the suction side of the pump. The pump is operating continuously while the tractor is in motion but fluid is only admitted to the suction side of the pump when conditions require that the implement is to be raised on the tractor. It will thus be seen that the pump is only in effective operation when oil is actually required to be pumped to the ram cylinder and thus continuous pumping of the oil is avoided, and also any excessive heating and aeration of the oil. When the implement is operated in the ground at a predetermined depth, which has been fixed by the control lever, the valve remains on the dead point until changed from it by variation in the draft or by the operator when he wishes to raise the implement on the tractor.

Under some conditions of operation and in operating some implements there may be an inclination to move the oil control valve more than necessary and thus cause unnecessary pumping of the oil. To avoid this, I provide damping means in connection with the control valve. For example, I provide, as shown at Fig. 4 a cylinder or dash-pot in which the end 14ᵇ of the valve 14 acts as a piston, and by providing a very small aperture 30ª at the end of the cylinder 30 and trapping oil in the cylinder 30, the piston end 14ᵇ will by its movement, either draw oil into, or force oil out of, the cylinder 30 through the small hole 30ª with the result that a damping action is given to the valve.

To prevent damage to the mechanism for operating the control valve I may make the lever 19 in two portions 19ᶜ, 19ᵈ, hinged together as shown in the detail at Figs. 5 and 5ª. This lever is of course situated between the valve 14 and the control rod 17, a spring 31 serving normally to hold together the two portions of the lever 19 as shown in Fig. 5ª. The arrangement is such that if the operator unduly forces the control, the jointed lever 19, which can only transmit a certain load (depending on the strength of the spring 31,) will, when its load is exceeded, permit of the control lever 15 being moved to the full extent of its travel without damaging the control valve or its mechanism, the excess movement or force applied simply causing the portion 19ª to pivot and stretch the spring 31.

An implement such as hereinbefore described is usually transported on a tractor by raising it to a predetermined height above the ground. I provide automatic means connected with the mechanism hereinbefore described for cutting off the supply of fluid to the pump 12 so that when the implement has been raised to a predetermined height it will automatically stop ascending. In the example shown this is accomplished in the following manner:—

When the implement 4 is raised by the mechanism hereinbefore described and shown in the drawings, the ram piston, in moving rearwardly, that is, outwardly, contacts with a projection 17ᵇ on the lever 17 (Fig. 2) and in continuing its movement it moves the lever 17 rearwardly, giving a corresponding movement to the valve control rod 18 and lever 19 and so moving the valve 14 to cause it to come to the dead point and close off the supply of oil to the pump. Thus when the implement is being transported no fluid is being pumped, which again provides the desired result that the oil is not being continuously moved by the pump and thereby avoiding heating and aerating as previously mentioned.

A safety valve may if desired be provided somewhere on the pipe line 22 between the pump and the ram cylinder 7c or on the ram cylinder itself, the spring loaded valve 32 shown in Figs. 1 and 8 on the ram cylinder 7c serves to protect the system from excessive pressures, the valve being opened by the end of the rod 27 abutting against it, as for example, when the implement strikes an obstruction.

I claim:—

1. A tractor having means for the attachment of an agricultural implement and a pressure-fluid control unit, including a pump, for raising and lowering the implement with reference to the tractor and valve means on the suction side of said pump whereby the operation of the unit is effected by controlling the admission of operating fluid to the pump.

2. A tractor having means for the attachment of an agricultural implement and having a pressure-fluid control unit, including a pump, for raising and lowering the implement with reference to the tractor, valve means on the suction side of said pump whereby operation of the unit is effected by controlling the admission of operating fluid to the pump and manual control means for said valve means.

3. A tractor having means for the attachment of an agricultural implement and having a pressure-fluid control unit, including a pump, for raising and lowering the implement with reference to the tractor, valve means on the suction side of said pump whereby operation of the unit is effected by controlling the admission of operating fluid to the pump, manual control means for said valve means, and means for automatically controlling said valve means in accordance with the draft on the implement.

4. A tractor having means for the attachment of an agricultural implement and having a pressure-fluid control unit, including a pump for raising and lowering the implement with reference to the tractor, valve means on the suction side of said pump whereby operation of the unit is effected by controlling the admission of operating fluid to the pump and means for automatically controlling said valve means in accordance with the draft on the implement.

5. A tractor comprising means for the attachment of an agricultural implement and a pressure-fluid control unit for raising and lowering the implement with reference to the tractor, said unit comprising a fluid pump, a pressure-fluid operable device connected to the pump, means for driving the pump from the tractor-propelling means, valve means on the suction side of the pump for controlling the admission of fluid to the pump, manual control means for the valve means and means for automatically controlling said valve means in accordance with the draft on the implement.

6. In a pressure-fluid control unit for raising and lowering an agricultural implement with reference to a tractor and which includes a pump; valve means for the pump comprising a piston valve, an inlet or suction port and an outlet port spaced therefrom, the valve being of such length that when it is in its mid-position or "dead point" it covers both said ports; and control means for moving said valve to one or other side to raise or lower the implement.

7. For a tractor for agricultural implements, a pump for supplying a pressure fluid for controlling the height of the implement with reference to the tractor, comprising means for driving the pump from the tractor-propelling means and valve means on the inlet side of the pump for controlling the admission of fluid to the pump and thus the operative effect of the pump on the implement.

8. In a tractor having means for the attachment of an agricultural implement and having a pressure-fluid control unit, including a pump, for raising and lowering the implement with reference to the tractor; valve means on the suction side of said pump whereby operation of the unit is controlled by controlling the admission of operating fluid to the pump, manual control means for said valve means, and means for damping the movement of said valve means.

9. In a pressure-fluid control unit for raising and lowering an agricultural implement with reference to a tractor and which includes a pump; valve means for the pump comprising a piston valve, an inlet or suction port and an outlet port spaced from the inlet port, the valve being of such length that when it is in its mid-position or "dead point" it covers both said ports, and a dash pot for damping the movement of the piston valve.

10. In a tractor having means for the attachment of an agricultural implement and a pressure-fluid control unit, including a pump, for raising and lowering the implement with reference to the tractor; valve means on the suction side of said pump whereby the position of the implement is controlled by controlling the admission of operating fluid to the pump and pressure-operable safety valve means on the delivery side of said pump.

11. A tractor adapted for the attachment of an agricultural implement and having a pressure-fluid control unit, including a pump, for raising and lowering the implement with reference to the tractor, valve means on the suction side of said pump whereby operation of the unit is effected by controlling the admission of operating fluid to the pump, manual control means for said valve means, and a lost motion, safety means in said manual control means.

12. In a tractor having means for the attachment of an agricultural implement and a pressure-fluid control unit, including a pump, for raising and lowering the implement with reference to the tractor; valve means on the suction side of said pump whereby the implement-controlling effect of the unit is controlled by controlling the admission of operating fluid to the pump, and means for cutting off the supply of fluid to the pump when the implement has been raised to a predetermined height.

13. In a tractor having means for the attachment of an agricultural implement and having a pressure-fluid control unit, including a pump, for raising and lowering the implement with reference to the tractor; valve means at the suction side of said pump whereby operation of the unit is effected by controlling the admission of operating fluid to the pump, manual control means for said valve means, means for damping the movement of said valve means and a pressure-operable safety valve on the delivery side of said pump.

14. A tractor adapted for the attachment of an agricultural implement and having a pressure-fluid control unit, including a pump, for raising and lowering the implement with reference to the tractor, valve means on the suction side of said pump whereby the position of the implement is controlled by controlling the admission of operating fluid to the pump, a manual and automatic control for said valve means, a lost motion safety means in said control and a pressure-operable safety valve means on the delivery side of said pump.

15. In a tractor having means for the attachment of an agricultural implement and a pressure-fluid control unit, including a pump, for raising and lowering the implement with reference to the tractor; valve means at the suction side of said pump whereby the operation of the unit is effected by controlling the admission of operating fluid to the pump, pressure-operable safety valve means on the delivery side of said pump and means for cutting off the supply of fluid to the pump when the implement has been raised to a predetermined height.

16. A tractor having means for the attachment of an agricultural implement and having a pressure-fluid control unit, including a pump, for raising and lowering the implement with reference to the tractor, valve means on the suction side of said pump whereby operation of the unit is effected by controlling the admission of operating fluid to the pump, a manual and automatic control for said valve means, a lost-motion, safety means in said control, pressure-operable safety valve means on the delivery side of said pump and means for cutting off the supply of fluid to the pump when the implement has been raised to a predetermined height.

17. A tractor having means for the attachment of an agricultural implement, a pressure-fluid control unit for raising or lowering the implement with reference to the tractor and comprising a fluid pump, means for driving same from the tractor-propelling means, a pressure-operable device having a fluid connection with the pump and a mechanical connection with the implement, a piston valve co-operating with admission and release ports for the pump and of such length that in its mid-position it covers said ports, a manual control for said valve and an automatic control therefor including a member operated by the draft on the implement acting against resistant means, the valve being returned to its mid-position when said pressure-operable device is set in operation due to displacement of the valve to one or other side of said mid-position.

18. A tractor having means for the attachment of an agricultural implement, a pressure-fluid control unit for raising or lowering the implement with reference to the tractor and comprising an oil pump, means for driving same from the tractor-propelling means, a ram device having a fluid connection with the pump and a mechanical connection with the implement, a piston valve co-operating with admission and release ports for the pump and of such length that in its mid-position it covers said ports, a manual control for said valve and an automatic control therefor operated against the action of resistant means by the draft on the implement, a "floating lever" operatively connected at spaced points to the manual control and to the valve, a fulcrum movable in accordance with the draft on the implement against the action of said resistant means and adapted to co-operate with said lever, the arrangement being that when the point of the lever operatively connected to the valve is moved to shift the valve from its mid-position, the resultant movement of the implement by said device causes a variation in draft which moves the fulcrum in such direction that said point of the lever is returned to the position corresponding to the mid-position of the valve which again closes the admission and release ports.

19. A tractor having means for the attachment of an agricultural implement, a pressure-fluid control unit for raising or lowering the implement with reference to the tractor and comprising an oil pump, means for driving same from the tractor-propelling means, a ram device having a fluid connection with the pump and a mechanical connection with the implement, a piston valve co-operating with admission and release ports for the pump and of such length that in its mid-position it covers said ports, a manual control for said valve including a lever consisting of two pivotally connected parts normally retained in a predetermined angular position by spring means and an automatic control for the valve operated against the action of resistant means by the draft on the implement, a "floating lever" operatively connected at spaced points to the manual control and to the valve, a fulcrum movable in accordance with the draft on the implement against the action of said resistant means and adapted to co-operate with said lever, the arrangement being that when the point of the lever operatively connected to the valve is moved to shift the valve from its mid-position, the resultant movement of the implement by said device causes a variation in draft which moves the fulcrum in such direction that said point of the lever is returned to the position corresponding to the mid-position of the valve which again closes the admission and release ports.

20. A tractor having an agricultural implement pivotally attached by links and comprising spring means for resisting movement of the implement due to the draft thereon and a fulcrum movable in accordance with the displacement of said spring and comprising an oil pressure power unit including a pump driven by the tractor propelling means, a piston and cylinder device hydraulically connected to said pump and mechanically connected to said links, a pressure operable safety valve connected to the discharge side of the pump and a piston valve at the admission side of the pump adapted in its mid-position to cover pump admission and release ports and control means for said valve comprising a manually operable handle connected to one end of a "floating lever" connected at its other end to the piston valve through a lever consisting of two pivotally connected parts retained in a predetermined angular position by spring means, said movable fulcrum being adapted to co-operate with said "floating lever" so that operation of the piston device has for effect to return the piston valve to its mid-position, and said piston having abutment means adapted to return the piston valve to its mid-position when the implement has been raised to a predetermined height on the tractor.

HENRY GEORGE FERGUSON.